(12) United States Patent
Peschka

(10) Patent No.: US 10,972,370 B1
(45) Date of Patent: Apr. 6, 2021

(54) MONITORING AND ANALYSIS OF CLOUD-BASED APPLICATIONS

(71) Applicant: Zscaler, Inc., San Jose, CA (US)

(72) Inventor: Steve Peschka, Goodyear, AZ (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 16/739,256

(22) Filed: Jan. 10, 2020

(51) Int. Cl.
*H04L 12/26* (2006.01)
*H04L 29/08* (2006.01)

(52) U.S. Cl.
CPC ........ *H04L 43/0817* (2013.01); *H04L 43/087* (2013.01); *H04L 43/0829* (2013.01); *H04L 43/12* (2013.01); *H04L 67/1097* (2013.01)

(58) Field of Classification Search
CPC ............ H04L 43/0817; H04L 43/0829; H04L 43/087; H04L 43/12; H04L 67/1097
USPC ........................................................ 709/224
See application file for complete search history.

(56) References Cited

U.S. PATENT DOCUMENTS

| | | | |
|---|---|---|---|
| 7,756,826 B2 | 7/2010 | Bots et al. | |
| 8,259,571 B1 | 9/2012 | Raphel et al. | |
| 8,429,111 B1 | 4/2013 | Kailash et al. | |
| 8,458,789 B1 | 6/2013 | Kailash et al. | |
| 8,464,335 B1 | 6/2013 | Sinha et al. | |
| 8,887,249 B1 | 11/2014 | Schekochikhin et al. | |
| 9,060,239 B1 | 6/2015 | Sinha et al. | |
| 9,369,433 B1 | 6/2016 | Paul et al. | |
| 9,569,195 B2 | 2/2017 | Schekochikhin et al. | |
| 9,654,507 B2 | 5/2017 | Gangadharappa et al. | |
| 9,906,425 B2 * | 2/2018 | Dasgupta | H04L 43/0894 |
| 10,007,699 B2 | 6/2018 | Pangeni et al. | |
| 10,200,267 B2 * | 2/2019 | Zafer | H04L 47/11 |
| 2009/0300045 A1 | 12/2009 | Chaudhry et al. | |
| 2010/0125903 A1 | 5/2010 | Devarajan et al. | |
| 2010/0175134 A1 | 7/2010 | Ali-Ahmad et al. | |
| 2011/0167474 A1 | 7/2011 | Sinha et al. | |
| 2013/0191185 A1 * | 7/2013 | Galvin | G06Q 10/10 705/7.37 |
| 2013/0291087 A1 | 10/2013 | Kailash et al. | |
| 2014/0026179 A1 | 1/2014 | Devarajan et al. | |
| 2014/0075005 A1 * | 3/2014 | Tung | G06F 11/3495 709/223 |

(Continued)

OTHER PUBLICATIONS

Best practices for monitoring cloud applications, Azure, Jul. 13, 2016.*

*Primary Examiner* — Frantz B Jean
(74) *Attorney, Agent, or Firm* — Clements Bernard Walker; Lawrence A. Baratta, Jr.; Jacob P. Beers

(57) ABSTRACT

Systems and methods include periodically sending a probe to a cloud application where the probe simulates user activity in the cloud application; receiving a response to the probe and determining one or more statistics of the cloud application based on the response; incorporating the one or more statistics in historical statistics; and causing a notification when any of the one or more statistics exceeds a defined threshold. The probe can be a cloud-based probe from a cloud-based system, and the systems and methods can also include receiving a response to an on-premises probe that was sent by a distributed agent that is separate from the cloud-based system; and incorporating one or more statistics associated with the response to the on-premises probe in the historical statistics.

20 Claims, 14 Drawing Sheets

(56) References Cited

U.S. PATENT DOCUMENTS

| | | | |
|---|---|---|---|
| 2014/0280917 A1* | 9/2014 | Lad | H04L 43/08 709/224 |
| 2015/0081881 A1* | 3/2015 | Eaton | G06K 9/6219 709/224 |
| 2015/0326613 A1 | 11/2015 | Devarajan et al. | |
| 2016/0028608 A1* | 1/2016 | Dasgupta | H04L 43/16 370/252 |
| 2016/0048558 A1 | 2/2016 | Kailash et al. | |
| 2016/0182328 A1* | 6/2016 | Bhasin | H04L 43/067 709/224 |
| 2017/0090760 A1 | 3/2017 | Kalipatnapu et al. | |
| 2017/0142068 A1 | 5/2017 | Devarajan et al. | |
| 2017/0223029 A1 | 8/2017 | Sharma et al. | |

\* cited by examiner

MONITORING AND ANALYSIS OF CLOUD-BASED APPLICATIONS

FIELD OF THE DISCLOSURE

The present disclosure relates to cloud computing. More particularly, the present disclosure relates to systems and methods for monitoring and analysis of cloud-based applications, such as, for example, Microsoft Office 365.

BACKGROUND OF THE DISCLOSURE

The Information Technology (IT) paradigm is shifting from on-premises systems (e.g., servers, storage, security, etc.) to the cloud. There are various advantages in terms of capital and operational cost savings and efficiencies as well as accessibility. In fact, applications are also moving to the cloud instead of being hosted within an enterprise network. A cloud application is where some, or all, of the processing logic and data storage is processed in the cloud. A user interacts with the cloud application via a web browser, a mobile application, a local client, etc., and the data processing is managed by a combination of the local device and a cloud computing solution. An example of a cloud application includes Microsoft Office 365 which is a cloud application providing word processing, spreadsheets, presentations, database, electronic mail (email), publishing, etc. Other examples of cloud applications include, without limitation, Dropbox for file storage, Google Docs for similar services as Office 365, Salesforce for Customer Relationship Management (CRM), and the like.

One of the biggest concerns IT administrators have when moving to the cloud is that they will lose visibility into the performance and availability of applications and services. Conventionally, the people, processes and products for the management of on-premises systems are under IT administrator control. There are not tools from cloud application providers to monitor continuously an enterprise' individual tenant in the cloud application. Of note, cloud applications are multi-tenant meaning the cloud application provider has various clients or tenants. There is a need for monitoring and analysis of cloud applications on an individual tenant basis.

BRIEF SUMMARY OF THE DISCLOSURE

The present disclosure relates to systems and methods for monitoring and analysis of cloud-based applications, such as, for example, Microsoft Office 365, including Exchange, SharePoint, OneDrive, Skype, etc. The present disclosure provides monitoring and analysis at the individual tenant level, providing individual notice to service impacts, performance, availability, etc. The present disclosure provides monitoring of the cloud applications at an individual tenant level for network and tenant performance and availability, threat intelligence, malware, etc. The monitoring is performed via cloud-based probes and distributed probes that are configured based on geographic coverage. The systems and methods are offered to the individual tenants as a cloud service without the need for local hardware or software, with the cloud-based probes. Further, the systems and methods include a Graphical User Interface (GUI) for reporting, visualization, analytics, etc.

In an embodiment, a system includes a plurality of nodes communicatively coupled to one another forming a cloud-based system, each node including one or more processors and memory with instructions that, when executed, cause the one or more processors to periodically send a probe to a cloud application where the probe simulates user activity in the cloud application, receive a response to the probe and determine one or more statistics of the cloud application based on the response, incorporate the one or more statistics in historical statistics, and provide a notification when any of the one or more statistics exceeds a defined threshold. The system can further include a plurality of distributed agents each configured to periodically send an on-premises probe to the cloud application where the probe simulates user activity in the cloud application, receive a response to the on-premises probe, and provide any of the response and one or more statistics associated with the response to the on-premises probe to the cloud-based system. The plurality of distributed agents can be on user equipment located at geographic locations where users of the cloud application are located. The cloud application can include Microsoft Office 365. The cloud application can include an audio and/or video conferencing application. The probe can be utilized to determine jitter, latency, and packet loss. The cloud application can include a collaboration application.

In another embodiment, a non-transitory computer-readable storage medium includes computer-readable code stored thereon for programming one or more processors to perform steps of periodically sending a probe to a cloud application where the probe simulates user activity in the cloud application; receiving a response to the probe and determining one or more statistics of the cloud application based on the response; incorporating the one or more statistics in historical statistics; and causing a notification when any of the one or more statistics exceeds a defined threshold. The probe can be a cloud-based probe from a cloud-based system, and the computer-readable code stored further programs the one or more processors to perform steps of receiving a response to an on-premises probe that was sent by a distributed agent that is separate from the cloud-based system; and incorporating one or more statistics associated with the response to the on-premises probe in the historical statistics. The distributed agent can be on user equipment located at geographic locations where users of the cloud application are located. The cloud application can include Microsoft Office 365. The cloud application can include an audio and/or video conferencing application. The probe can be utilized to determine jitter, latency, and packet loss. The cloud application can include a collaboration application. In a further embodiment, the foregoing steps associated with the computer-readable code can be performed as a method.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server which may be used in the cloud-based system of FIG. 1 or the like;

DETAILED DESCRIPTION OF THE DISCLOSURE

Again, the present disclosure relates to systems and methods for monitoring and analysis of cloud-based applications, such as, for example, Microsoft Office 365, including Exchange, SharePoint, OneDrive, Skype, etc. The present disclosure provides monitoring and analysis at the individual tenant level, providing individual notice to service impacts, performance, availability, etc. The present disclosure provides monitoring of the cloud applications at an individual tenant level for network and tenant performance and availability, threat intelligence, malware, etc. The monitoring is performed via cloud-based probes and distributed probes that are configured based on geographic coverage. The systems and methods are offered to the individual tenants as a cloud service without the need for local hardware or software, with the cloud-based probes. Further, the systems and methods include a Graphical User Interface (GUI) for reporting, visualization, analytics, etc.

Example Cloud System Architecture

Figure 1:
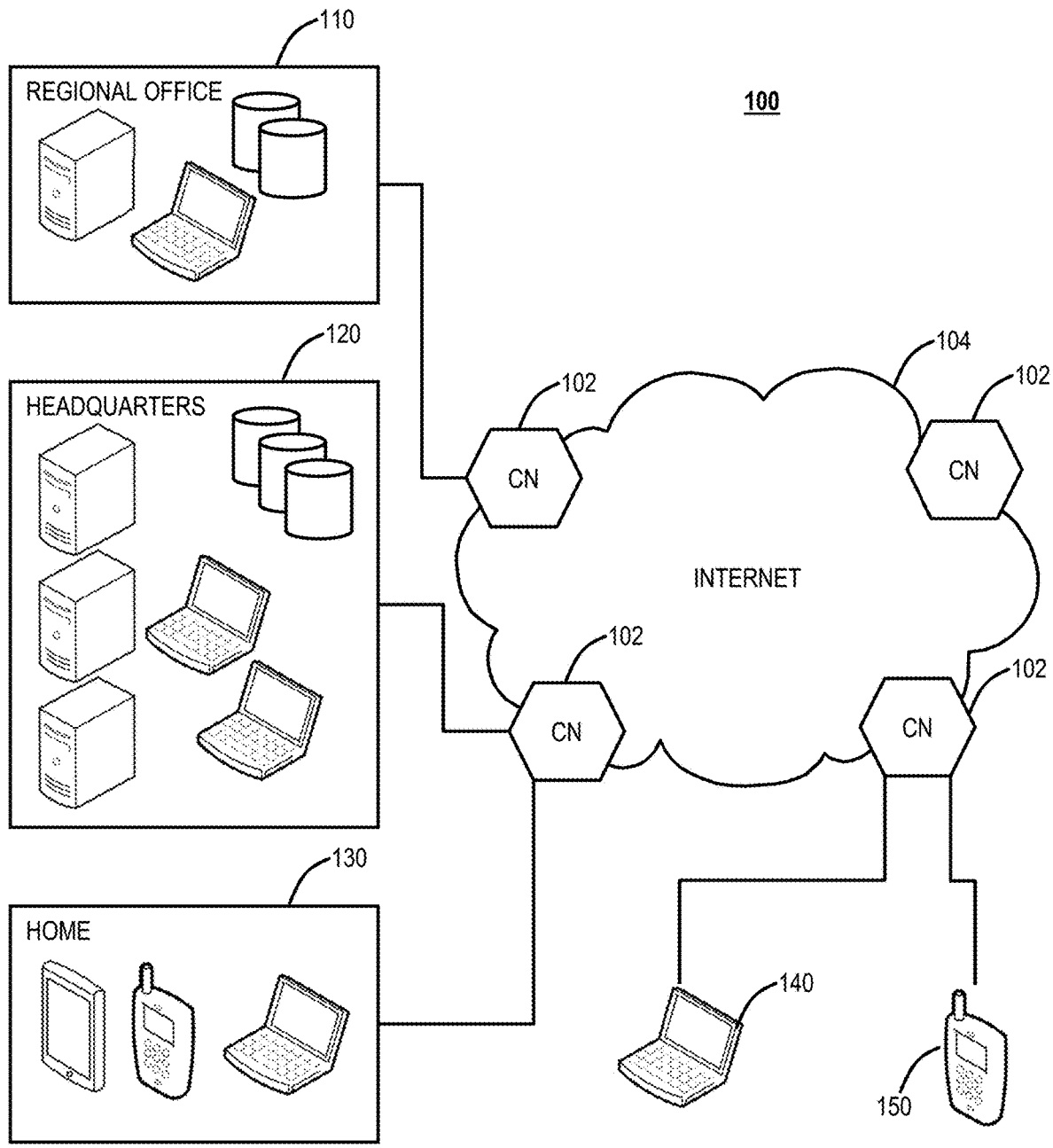
FIG. 1 is a network diagram of a cloud-based system for implementing various cloud-based services.
Figure 2:
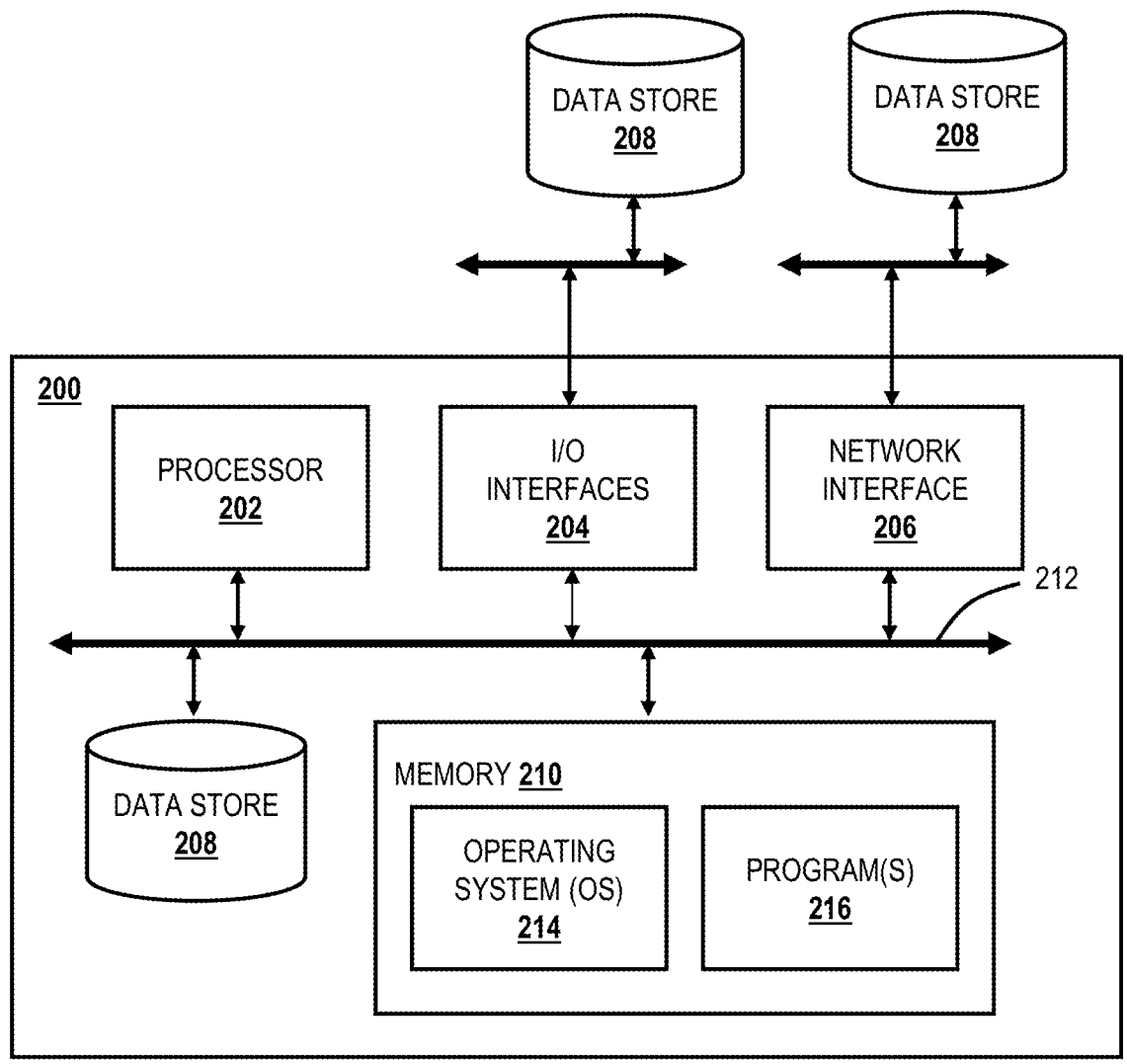

FIG. 1 is a network diagram of a cloud-based system 100 for implementing various cloud-based services. The cloud-based system 100 includes one or more cloud nodes (CN) 102 communicatively coupled to the Internet 104 or the like. The cloud nodes 102 may be implemented as a server 200 (as illustrated in FIG. 2), or the like, and can be geographically diverse from one another, such as located at various data centers around the country or globe. For illustration purposes, the cloud-based system 100 can include a regional office 110, headquarters 120, various employee's homes 130 with associated devices, laptops/desktops 140, and mobile devices 150 each of which can be communicatively coupled to one of the cloud nodes 102. These locations 110, 120, 130 and devices 140, 150 are shown for illustrative purposes, and those skilled in the art will recognize there are various access scenarios to the cloud-based system 100, all of which are contemplated herein.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end-users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS) where X is security, access, etc.

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as one example embodiment of a cloud-based system, and those of ordinary skill in the art will recognize the systems and methods described herein contemplate operation with any cloud-based system.

Two example services include Zscaler Internet Access (ZIA) (which can generally be referred to as Internet Access (IA)) and Zscaler Private Access (ZPA) (which can generally be referred to as Private Access (PA)), from Zscaler, Inc. (the assignee/applicant of the present application). The IA service can include firewall, threat prevention, Deep Packet Inspection (DPI), Data Leakage Prevention (DLP), and the like. The PA can include access control, microservice segmentation, etc. For example, the IA service can provide a user with secure Internet Access, and the PA service can provide a user with access to enterprise resources in lieu of traditional Virtual Private Networks (VPNs).

In the present disclosure, the cloud-based system 100 can provide a cloud application, such as Office 365. Another cloud-based system 100 can provide a monitoring system for monitoring the cloud application. In an embodiment, the cloud-based system 100 as the monitoring system can be a distributed security system or the like, such as the ZIA and/or ZPA. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as malware detection, spam filtering, Uniform Resource Locator (URL) filtering, antivirus protection, bandwidth control, DLP, zero-day vulnerability protection, policy enforcement, web 2.0 features, and the like. In an embodiment, the cloud-based system 100 may be viewed as Security-as-a-Service through the cloud, such as the IA.

In an embodiment, the cloud-based system 100 can be configured to provide security and policy systems and methods. The mobile device 150 may include common devices such as laptops, smartphones, tablets, netbooks, personal digital assistants, MP3 players, cell phones, e-book readers, and the like. The cloud-based system 100 is configured to provide inline security and policy enforcement for devices in the cloud. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, the geographical distribution of the cloud nodes 102, policy shadowing of users, which is dynamically available at the cloud nodes 102, etc.

When providing inline security, the cloud-based system 100 is required to minimize latency for user experience while avoiding incorrect classifications. For example, a cloud node 102 is located between a user device and the Internet 104 and/or an enterprise network. The cloud node 102 can perform processing on content items exchanged therebetween. As described herein, a content item can include a packet, a file (any type), an email, a streaming session, a resource such as defined by a Uniform Resource Locator (URL), etc. The cloud node 102 can include various data inspection engines that are configured to perform a threat classification on a content item, e.g., clean, spyware, malware, undesirable content, innocuous, spam email, unknown, etc. In an embodiment, the threat classification may be reduced to a subset of categories, e.g., violating, non-violating, neutral, unknown. The threat classification can be utilized to determine appropriate actions such as allow, block, warn, perform further processing, etc.

Example Server Architecture

FIG. 2 is a block diagram of a server 200, which may be used in the cloud-based system 100, in other systems, or standalone. For example, the cloud nodes 102 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Figure 3:
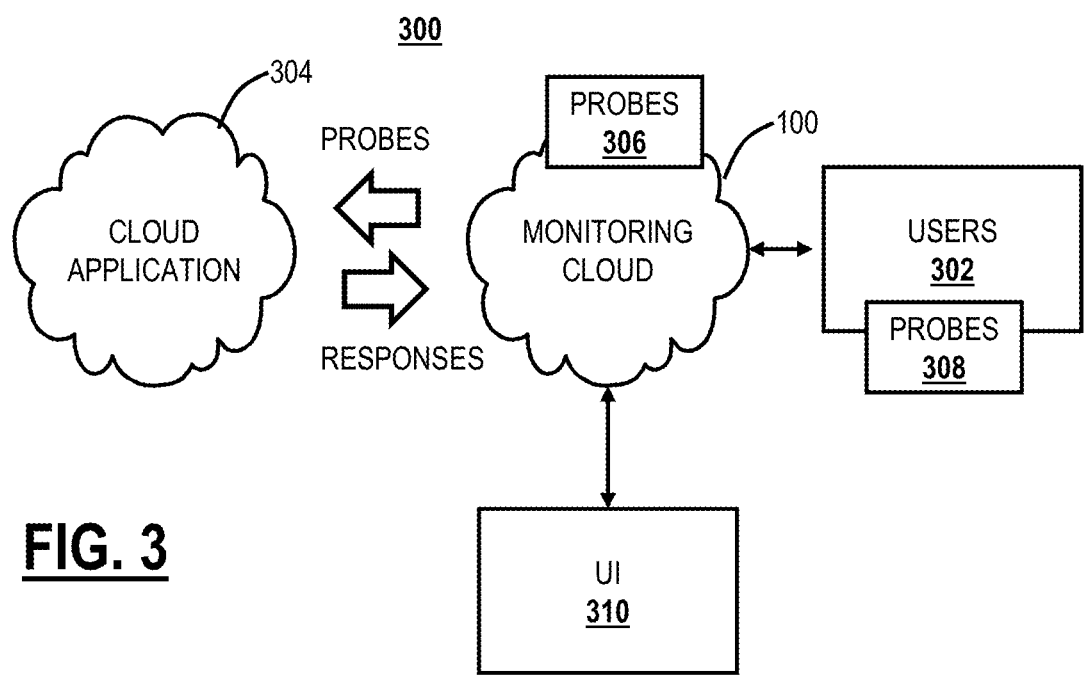
FIG. 3 is a block diagram of a monitoring system that includes the cloud-based system of FIG. 1 as a monitoring cloud for one or more users associated with one or more cloud applications.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.
Monitoring System FIG. 3 is a block diagram of a monitoring system 300 that includes the cloud-based system 100 as a monitoring cloud for one or more users 302 associated with one or more cloud applications 304. The monitoring system 300 includes synthetic health probes 306 that are issued by the cloud-based system 100. In addition to that, users 302 can install distributed probes agents and run health probes 308 from as many different geographical locations as desired. This gives the users 302 a full geographical mesh view of tenant performance and availability of the one or more cloud applications 304. The present disclosure includes the monitoring of any type of cloud application 304. In an embodiment, the one or more cloud applications 304 include SharePoint Online, Exchange Online, OneDrive for Business, Power BI, Microsoft Teams, and Skype for Business, although other types of cloud applications 304 are also contemplated. Specifically, the present disclosure is described herein with reference to Office 365 for illustration purposes, and those of ordinary skill in the art will appreciate any type of cloud application 304 is contemplated, including, for example, Zoom, Dropbox, Salesforce, QuickBooks, Amazon Web Services (AWS), and the like.

The monitoring system 300 performs various core monitoring features using the probes 306, 308 to evaluate different parts of the Office 365 request cycle—for example, how healthy are the servers in an Office 365 tenant? How much time is it taking on those servers itself to process the health probes 306, 308? How much time is it taking across the network to process Office 365 requests? How does the network performance for these requests vary by both service—SharePoint Online and One Drive for Business—as well as relative to all of the other locations where there are the users 302? The monitoring system 300 network analysis features can help sort out bottlenecks.

In addition, the monitoring system 300 includes the following monitoring features:

Email Transport Monitoring—monitor to make sure that email messages are being delivered to Office 365, as well as outside of Office 365.

Query and Crawl Monitoring—the search service is one of the most important services in SharePoint Online. When it is not working, the users 302 think the site is down or broken. The monitoring system 300 monitors both the query and crawl aspects of the search service.

Large List Monitoring—large lists are one of the most common causes of performance issues in SharePoint. The monitoring system 300 monitors both the performance and size so the users 302 know at all times performance and can use that to take remediation steps when needed.

Secure Web Site Monitoring—many organizations are building applications ("apps") for SharePoint and hosting them in their own web sites. Those apps are frequently just as important to the business as SharePoint itself. The Secure Web Site Monitoring feature measures the performance and availability of them as well.

Threat Intelligence Monitoring—the monitoring system 300 can monitor threat intelligence information about their usage. Find out when an organization is being attacked, or when individual users 302 within an organization are getting attacked. Find out the first time new malware is sent to a user 302. Also, it is possible to find out if a user 302 has become infected and is uploading documents with malware in them to SharePoint Online or One Drive for Business.

Log Shipping—most organizations require at least 12 months of SharePoint Online and OneDrive for Business activity logs for things such as compliance, record keeping requirements, discovery for legal reasons, etc. Office 365 only saves two months' worth of these logs; with the Log Shipping feature, the monitoring system 300 can save 12 months or more of these activity logs to meet all historical usage requirements. The monitoring system 300 can also create several Top 10 reports from this data, such as Top 10 used sites, Top 10 most active users, Top 10 most frequently performed operations, etc.

The monitoring system 300 also includes integration with the Office 365 Service Info. This gives a service-level view of the health of various Office 365 services.

Finally, the monitoring system 300 has a Dashboard Reports feature, via a User Interface (UI) 310.

The cloud-based system 100 can use Application Programming Interfaces (APIs) associated with the cloud application 304. For example, illustrating the configuration with Office 365, the user 302 can grant access to the monitoring system 300, specifically the cloud-based system 100, when signed into Azure Active Directory (AD). The Azure AD provides a token to the cloud-based system 100 to access resources. That token only "works" with the context of the user 302 that consented—so the monitoring system 300 never has more rights than that account.

The cloud-based system 100 uses tokens, and those tokens grant access to a specific resource in the context of a specific user. An access token is a security token that is issued by an authorization server. It contains information about the user and the app for which the token is intended, which can be used to access Web APIs and other protected resources. Accordingly, the monitoring system 300 cannot "look" at any resource the user account does not have rights to. It is possible to invalidate any token by changing the account password, as well as deleting the Service Principal associated with application consent.

Notification

The monitoring system 300 provides various user notifications based on events and the overall state of the cloud application 304. The notifications can include emails to individuals, emails to groups, text messages, chunks of data sent (webhook), etc. The notifications can be sent based on the start/end of an outage, status change, network performance for a distributed agent, slow search queries, change in search query results, detection of no search query results, version changes, offline distributed agents, delay in inbound/outbound email, etc. That is, whenever something occurs with respect to the cloud application 304, users 302 want to know about it. A webhook is like a web page that is built, and when there's a notification from the monitoring system 300, it is pushed out to that webhook. The user 302 can develop code to look at the information about the notification and decide what to do with it. This can include user-defined workflows, integrate the data into another incident management system or line of business application, update an internal web site with details, etc.

Monitoring System Versus Service Info

Office 365 Service Info is a status about the service as a whole, provided by Microsoft. Microsoft only changes it when something impacts a significant number of tenants. It takes a while from when something starts happening to when the status is updated. The monitoring system 300 looks at an individual tenant. It is monitoring every minute or two so it is known right away if there is a problem. For example, the service status may not change, but the tenant can still go down. The monitoring system 300 provides quicker tenant monitoring relative to service status updates. Also, the monitoring system 300 provides loads of performance data for the tenant that is not available elsewhere.

Distributed Probes

The probes 306, 308 are health probes with the probes 306 from the cloud-based system 100 and the probes 308 from distributed agents associated with the users 302, and in different geographic locations. For example, the distributed agents can be installed wherever desired, such as at locations where monitored users 302 of the cloud application 304 are located. This enables monitoring of the performance in all locations where the users 302 are located. For the distributed agents, when there are problems detected with the probes 308, there are diagnostics performed to ensure the problems are with the cloud application 304 and not with the local machine or network. The cloud-based probes 306 provide a view from a data center in the cloud of the performance and availability of various cloud services. The distributed probes 308 provide a view from different geographical locations of cloud services.

The probes 306, 308 can simulate end-user actions periodically with respect to the cloud application 304, to detect degradation in service health. The monitoring system 300 knows what to expect for each probe 306, 308 request and to determine the latency of each request. The monitoring system 300 can assist in determining if an issue is transient or persistent. In an embodiment, the probes 306, 308 can be sent from a user's 302 device associated with the cloud application 304.

In an embodiment, the probes 306, 308 work in conjunction with one another. For example, the probes 306 are continually performed by the cloud-based system 100. The probes 308 as distributed probes may be periodically performed, e.g., based on a set threshold for each location such as when it is taking too long to run a probe 306 or when there are outages including local outages, as well as continually.

In addition, sometimes outages are specific to a particular geographical region. There can be cases where the cloud probes 306 are running successfully, but users 302 in a geographic region are not able to connect to the cloud application 304, such as if there are Azure Active Directory issues. By installing the distributed agent in those locations where you have users, you can be assured that if there is an issue, one will find out about it no matter what region is being impacted.

When the probes 306, 308 indicate problems, the monitoring system 300 can automatically run a set of diagnostics in that location to try and determine if it is a cloud application 304 issue, or if there is a problem on the local machine or network. These diagnostics check the local network cards, Domain Name System (DNS), validate what addresses DNS is resolving to in case it's become misconfigured, check the proxy server, and finally check a non-cloud application site on the Internet. If all of those check out, then the problems associated with the probes 306, 308 indicate an issue with the cloud application 304.

In addition to the probes 306, 308, the monitoring system 300 can include API integration between the cloud-based system 100 and the cloud application 304.

Thus, the monitoring system 300 can collect data about the cloud application 304 based on the probes 306, 308 which include cloud probes 306 and distributed, on-premises probes 308, and from the cloud application 304 itself. Further, the cloud-based system 100 can be a multi-tenant cloud where there are various users 302 from various different organizations. As such, the monitoring system 300 can consolidate data from the probes 306, 308 from different users, and/or from different organizations to determine a comprehensive view of the cloud application 304, both globally and individually.

Search Monitoring

The cloud application 302 may be "up" but "not working." For example, the search service in SharePoint Online is a critical component. Much of the content seen in pages may come from search results. The navigation in the site can come from search results. If the search service is running slowly—or not working at all—then the SharePoint site may be up, but to the users 302, it will look like it's not working. The search monitoring features of the monitoring system 300 helps to ensure the detection of this situation any time it occurs.

In an embodiment, the monitoring system 300 enables a user 302 to define a query using Microsoft's KQL—Keyword Query Language—so a query can be fashioned that can conform precisely to business requirements. Then monitoring parameters are set around the query. For example, if it takes longer than "x" seconds to execute that query, the monitoring system 300 can send a notification. In addition, many organizations use the query engine to build custom applications, so they expect the same set of results anytime they query for certain metadata. The monitoring system 300 can configure the search monitoring so that it provides a notification anytime the search results change, or if no search results are returned at all. In both cases, either of these scenarios could result in a site that appears broken to users 302.

The other part of the search engine is the crawl. A query is a set of results, whereas crawling is the process of indexing all of the content in a site. For example, a problem with Microsoft SharePoint Online includes when a user 302 uploads a document, but it is not showing up in search results—Why not? When will it show up? The monitoring system 300 helps to fill in the gaps with this kind of information. The monitoring system 300 monitors the crawls in a site and can provide when the last time was that a crawl completed. In addition to that, the monitoring system 300 keeps those statistics around for trends over time—for example, crawls taking longer and longer. This can be used to spot outliers. Also, the monitoring system 300 can provide a global view of what other users 302 are experiencing with their crawls or queries, to provide an idea of how crawl times compare to other customers. This information can be presented in an anonymous manner.

Email Transport Monitoring

The email transport is another example of where a service may be "up" but "not working." For example, email transport emails include the inability to send/receive messages. The monitoring system 300 can track issues with email transport. The email transport monitoring can include a threshold on how long a message should take to be delivered into or out of an organization. If messages are not being delivered within that time frame, the monitoring system 300 can send a notification.

The monitoring system 300 can provide help track down problems. For example, one customer that had misconfigured DNS. There was an email server that was no longer being used but was still in DNS. As a result, every time a message was sent to it, delivery failed. Using email transport monitoring reports, the monitoring system 300 is able to identify and fix this issue.

Large List Monitoring

Large lists are a problem in SharePoint. The guidance is to keep list sizes small enough to keep them performing well. That was easier said than done to know which lists were getting big, which were rendering slowly, etc. The List Monitoring feature monitors list size. A user 302 tells the monitoring system 300 how long it should take to render the list, and if it takes longer than that, a notification is provided. It is also possible to set a size threshold for lists; when any monitored list gets bigger than that threshold, the monitoring system 300 sends a notification. Remediation steps may include splitting the data up into multiple lists, creating new views that show fewer items, adding additional indexed fields or views on the list, etc.

Web Site Monitoring

Cloud applications 304, such as SharePoint, allow users to build applications that can be hosted in a web site and work with data in SharePoint Online sites. Many applications are just as mission-critical to an organization as the cloud application 304 itself. The Web Site Monitoring feature in the monitoring system 300 uses the same architecture and techniques that are used to monitor the cloud application 304, with any web site or Representational state transfer (REST) API that is either secured with Azure Active Directory or allows anonymous access. All of the reporting around performance and outages for these web sites can be included with the same reports used to report on the cloud application 304 itself.

Log Shipping

Figure 4A:
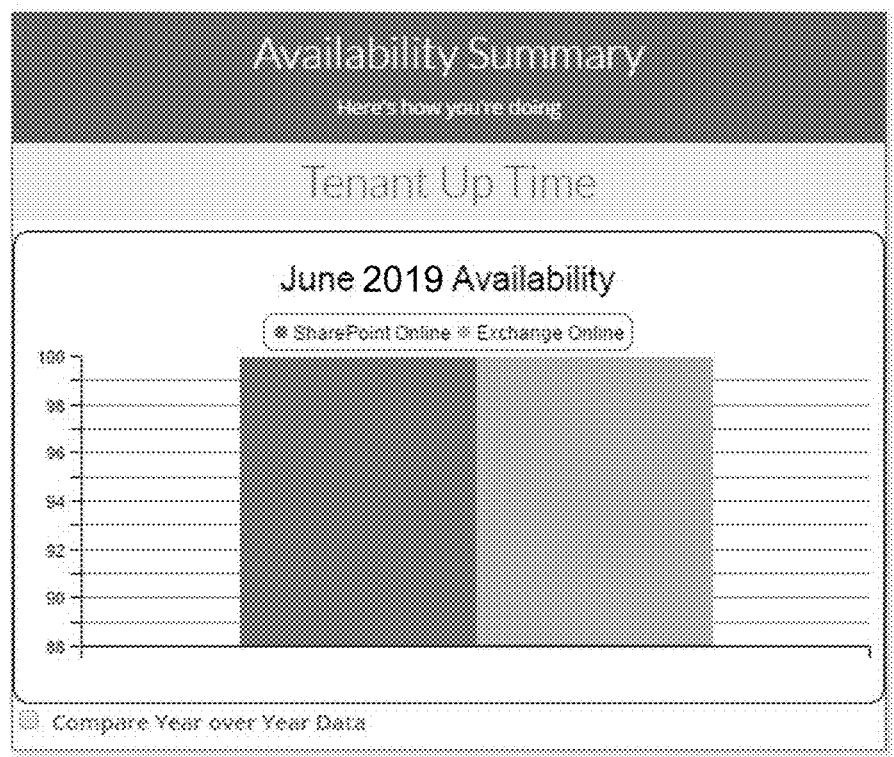
FIGS. 4A-4I are screenshots of example monitoring data provided by the monitoring system of FIG. 3.
Figure 4B:
Figure 4C:
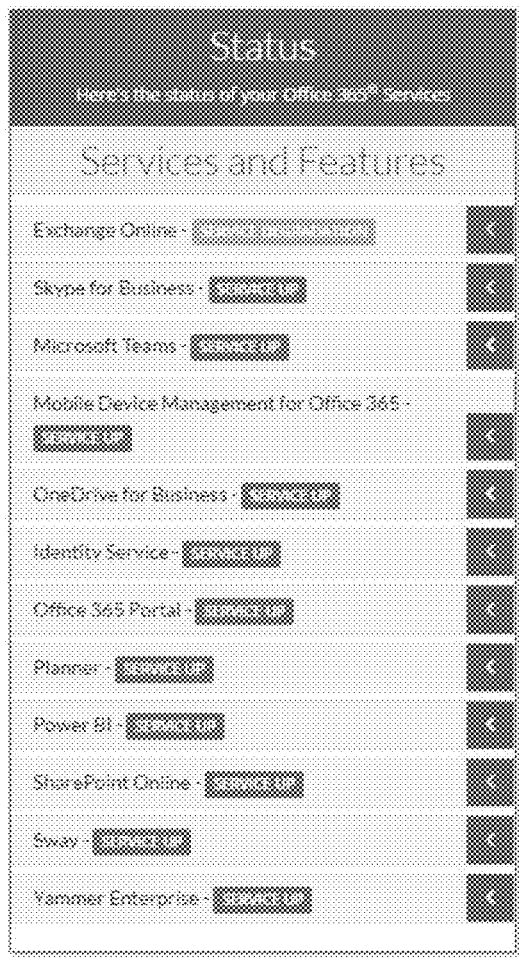
Figure 4D:
Figure 4E:
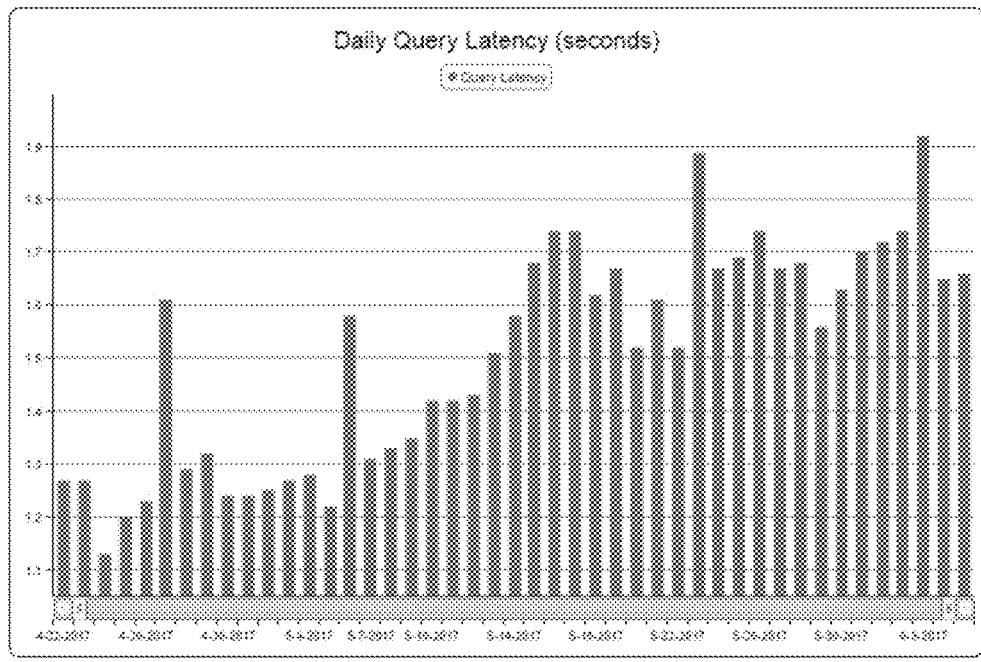
Figure 4F:
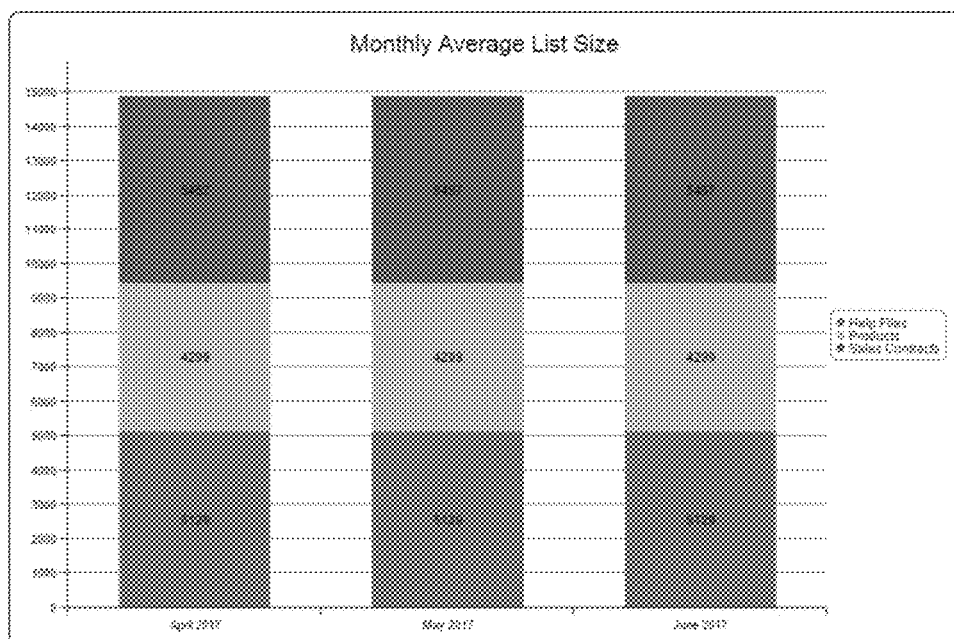
Figure 4G:
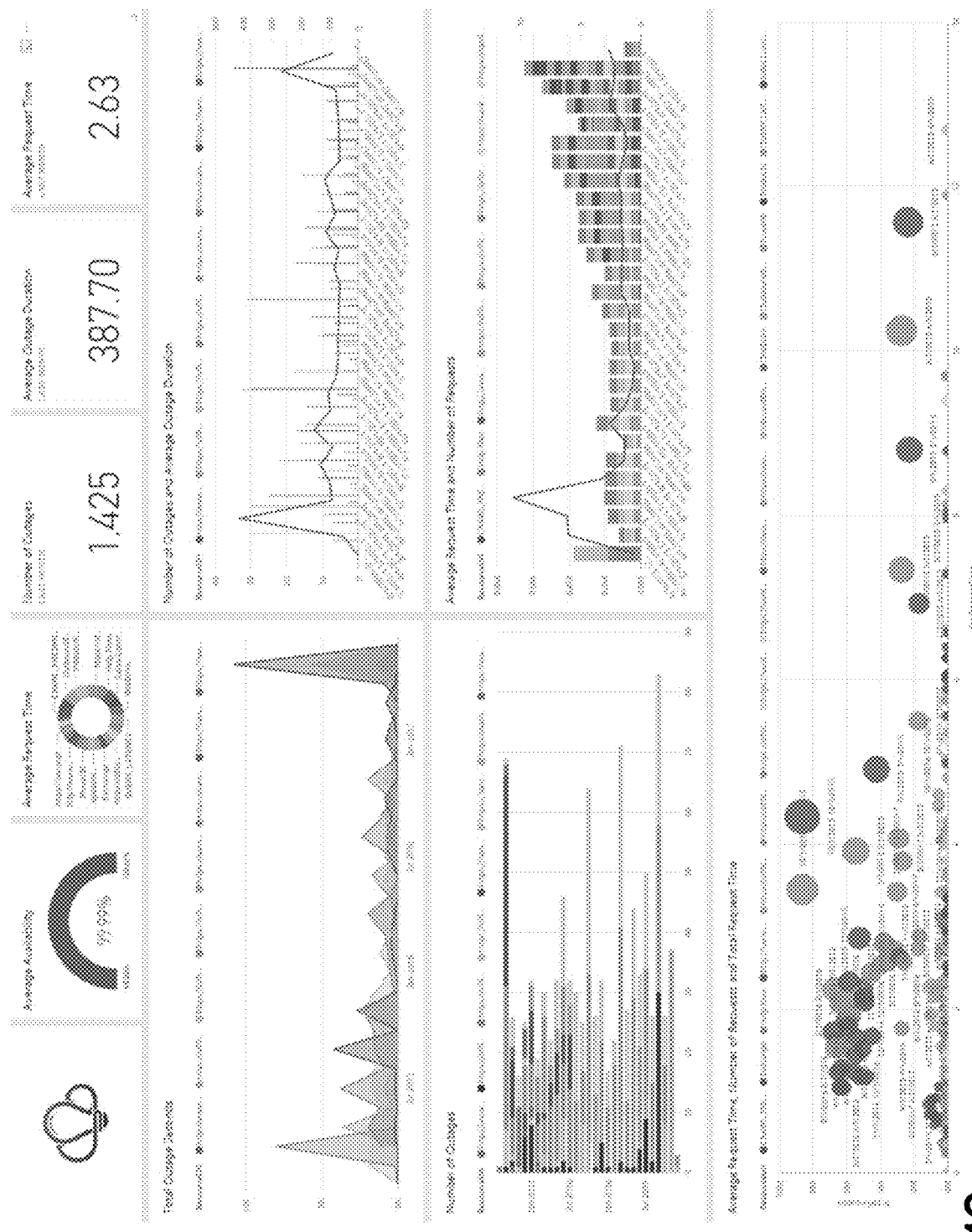

Most organizations have data retention policies that require SharePoint Online and OneDrive for Business activity logs be kept for at least 12 months. These are needed for compliance, record keeping, auditing, lawsuit discovery, etc. Office 365 only stores activity logs for 2 months/The Log Shipping feature stores these logs for a minimum of 12 months. Any prior month's activity log can be downloaded at any time UI Reports FIGS. 4A-4I are screenshots of example monitoring data provided by the monitoring system 300. These screenshots are examples and are presented through the UI 310 of the monitoring system 300. FIG. 4A is a chart of availability. FIG. 4B is a display of messages. FIG. 4C is a chart of the status of cloud services. FIG. 4D is a chart of monitored resources. FIG. 4E is a chart of latency over time. FIG. 4F is a chart of average list size. Finally, FIG. 4G is a dashboard. Of course, the reports may be customized, downloaded, exported, etc.

Threat Intelligence Monitoring

The cloud application 304 can provide threat intelligence information about activity and content. The monitoring system 300 can monitor that activity for critical security threats. These threats cover common scenarios such as an organization is under attack, or even one or more individuals are the target of an attack. That allows tracking where the attack is coming from, as well as ensuring any targeted users 302 are adequately protected by anti-virus protection. It can provide a notification the first time new malware is found targeting an organization so one can ensure up to date virus definitions. It can also alert one to the case where a user has unknowingly become infected and has started uploading documents to SharePoint Online or OneDrive for Business.

Figure 4H:
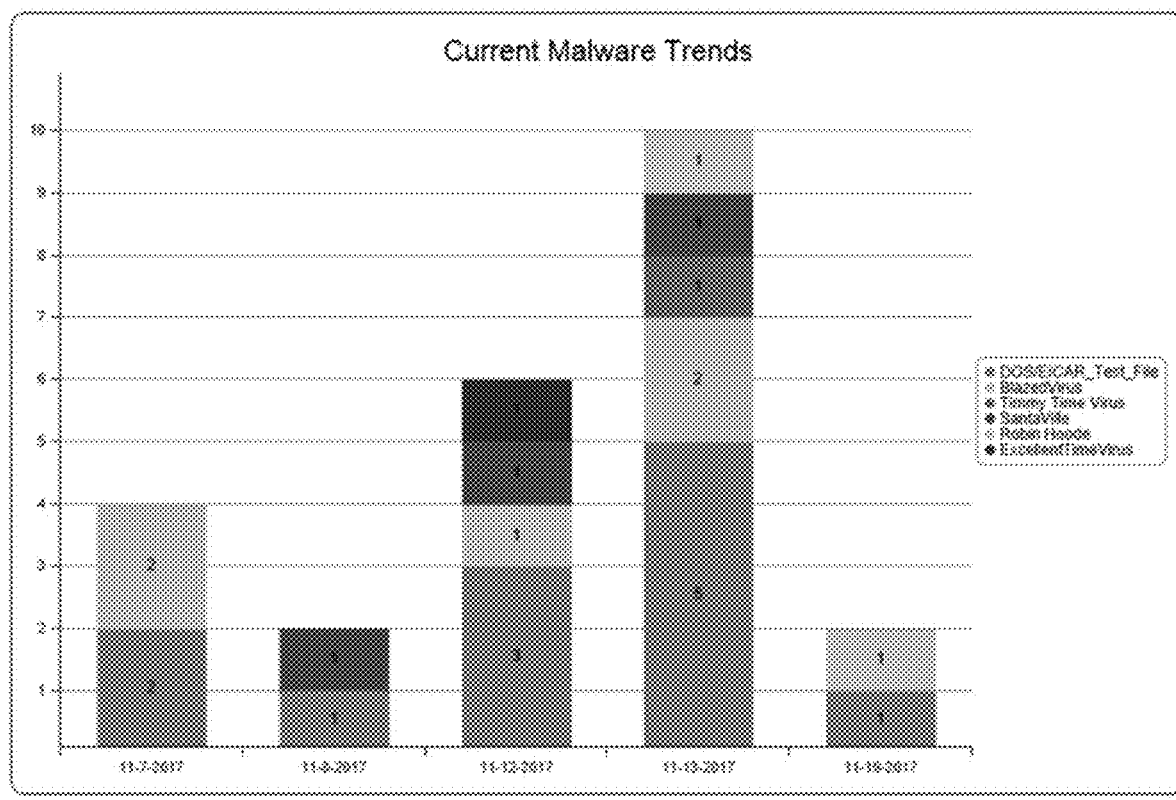
Figure 4I:
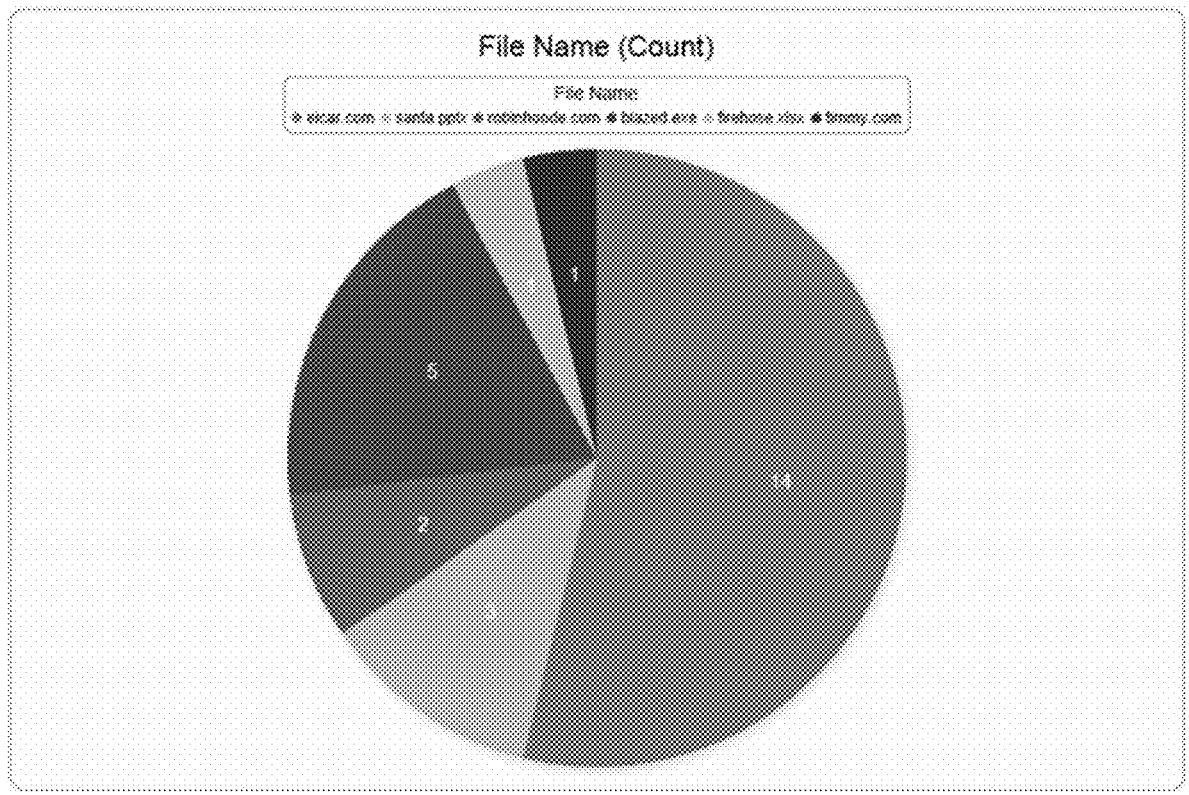

FIG. 4H is a graph of the malware trends for an organization. FIG. 4I is a graph of file names for malware.

Video and Audio Conferencing Monitoring

In an embodiment, the monitoring system 300 can be configured to monitor a cloud application 304 for video and/or audio conferencing (real-time services), e.g., Teams, Skype, Zoom, WebEx, etc. Here, the probes 306, 308 can be used to monitor call quality metrics such as jitter, packet loss, packet reorder ratio, round trip latency, calling firewall issues, etc. With the probes 306, 308, it is possible to set different notification thresholds for different call metrics as desired. The monitoring application starts with are preconfigured for the minimum performance requirements. One can set up these notification thresholds on a location by location basis to match the network performance characteristics of each different deployment area.

In addition to performance monitoring, each time the monitoring system 300 does a check, the monitoring system 300 can also test network connectivity to a variety of calling service endpoints that may be used in the region where a distributed agent is deployed. For example, with Skype and Microsoft Teams, each one of these endpoints is defined by an IP address, port, and protocol that the Teams and Skype clients may need to access. The monitoring system 300 tests every one of these to ensure that there are not any network configuration issues that could block calls from a particular location, as well as to be able to detect when a service endpoint is unavailable. This can also help identify potential issues when users are unable to make or sustain calls with the Teams or Skype clients.

Figure 5A:
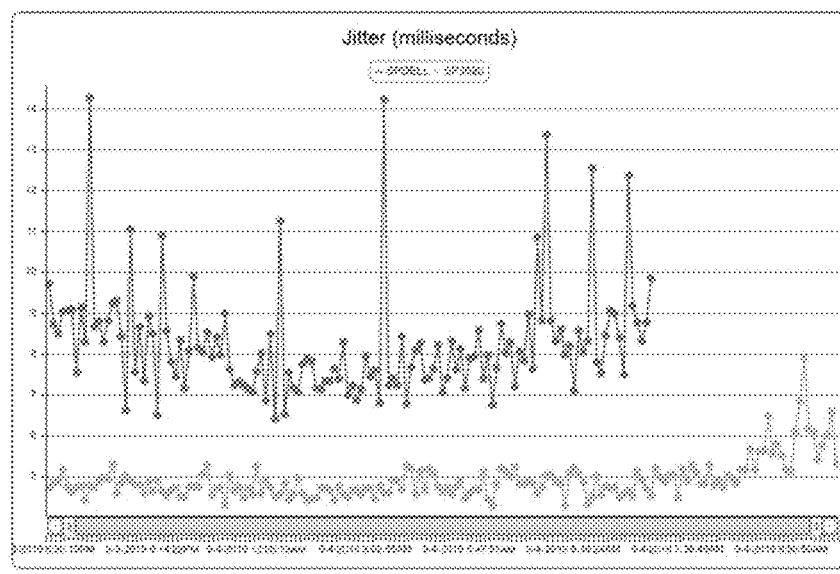
FIGS. 5A-5C are charts of statistics associated with the monitoring system of FIG. 3 monitoring IP-based telephony services and applications.
Figure 5B:
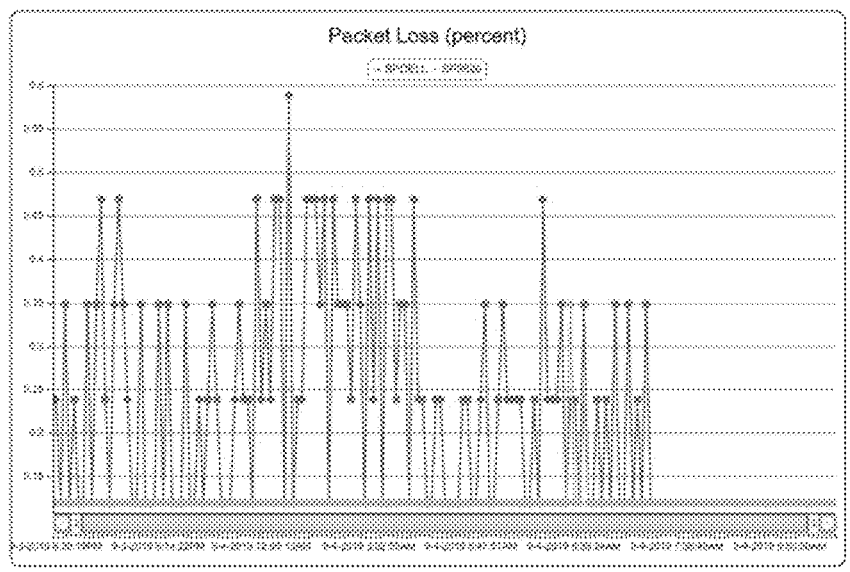
Figure 5C:
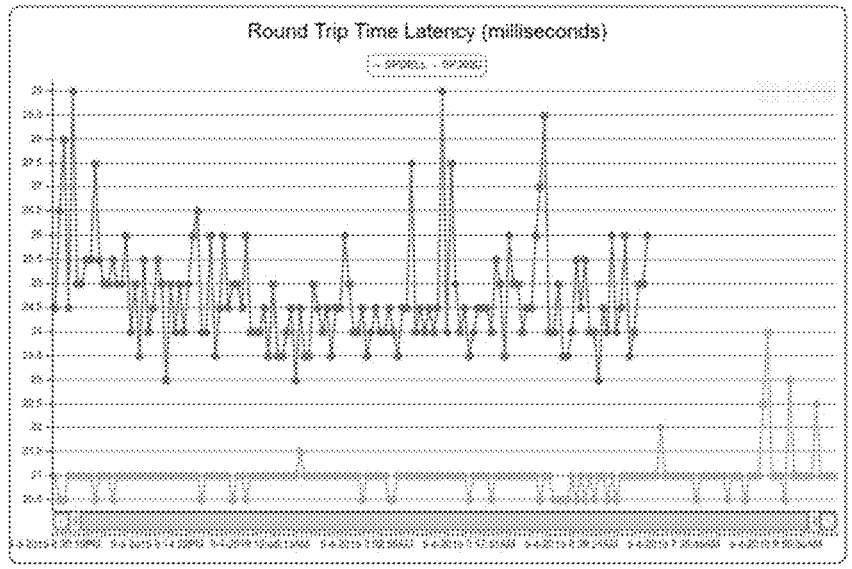

FIGS. 5A-5C are charts of statistics associated with the monitoring system 300 monitoring IP-based telephony services and applications. FIG. 5A is a chart of jitter, at two different locations. FIG. 5B is a chart of packet loss at the two different locations. FIG. 5C is a chart of Round Trip Time latency, at the two different locations.

Collaboration Platform Monitoring

Figure 6A:
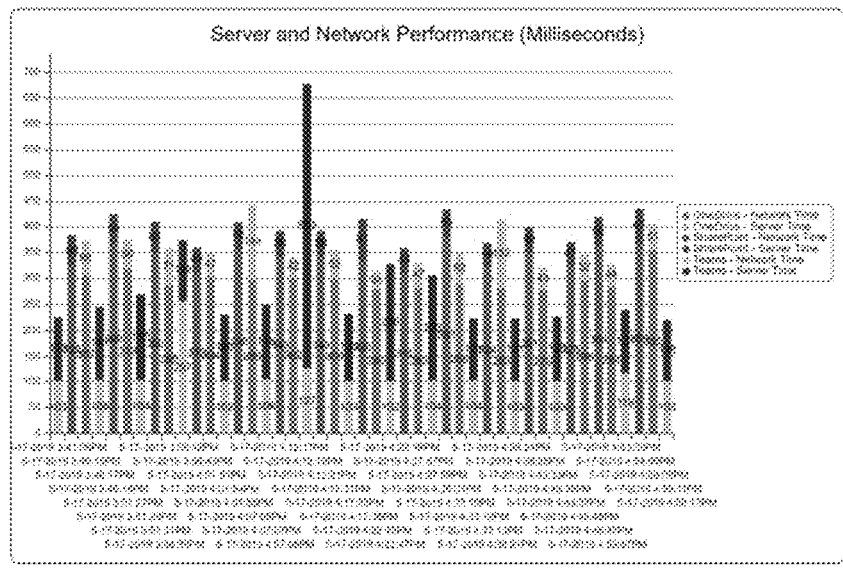
FIGS. 6A-6C are charts of statistics associated with the monitoring system of FIG. 3 monitoring a collaboration application, namely Microsoft Teams, in addition to Office 365.
Figure 6B:
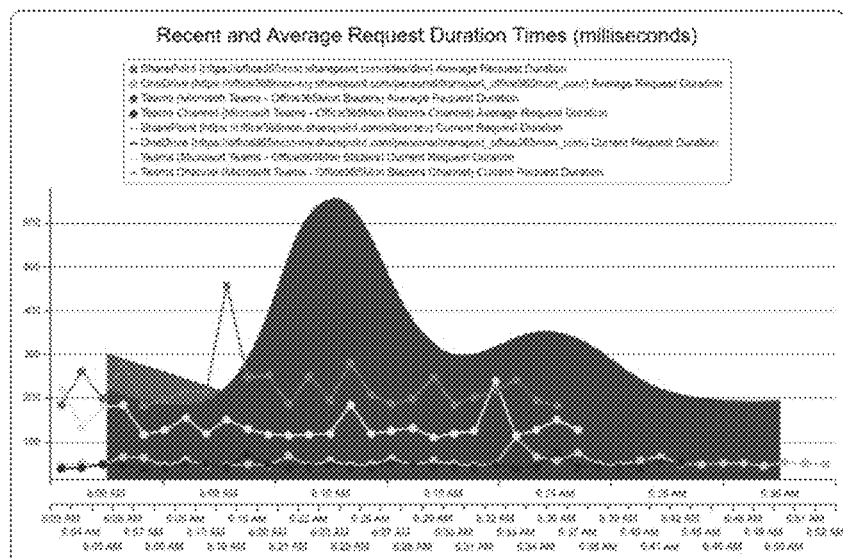
Figure 6C:
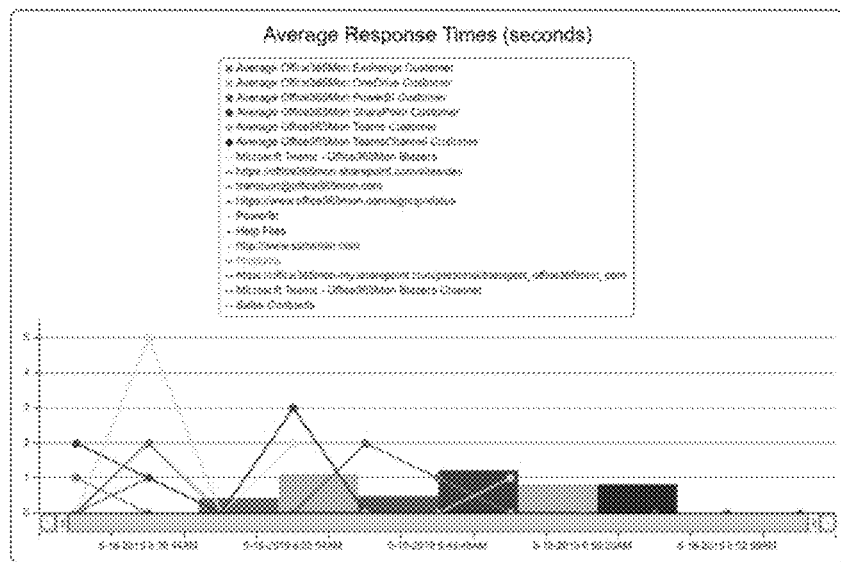

In another embodiment, the monitoring system 300 can be configured to monitor a cloud application 304 for collaboration, e.g., Microsoft Teams, Slack, etc. The distributed probes 306, 308 can be used to monitoring the overall service as well as individual channels. FIGS. 6A-6C are charts of statistics associated with the monitoring system 300 monitoring a collaboration application, namely Microsoft Teams, in addition to Office 365. FIG. 6A is a chart of server and network performance. FIG. 6B is a chart of recent and average request duration times. FIG. 5C is a chart of average response times.

Deeper Real-Time Performance Data

Figure 7A:
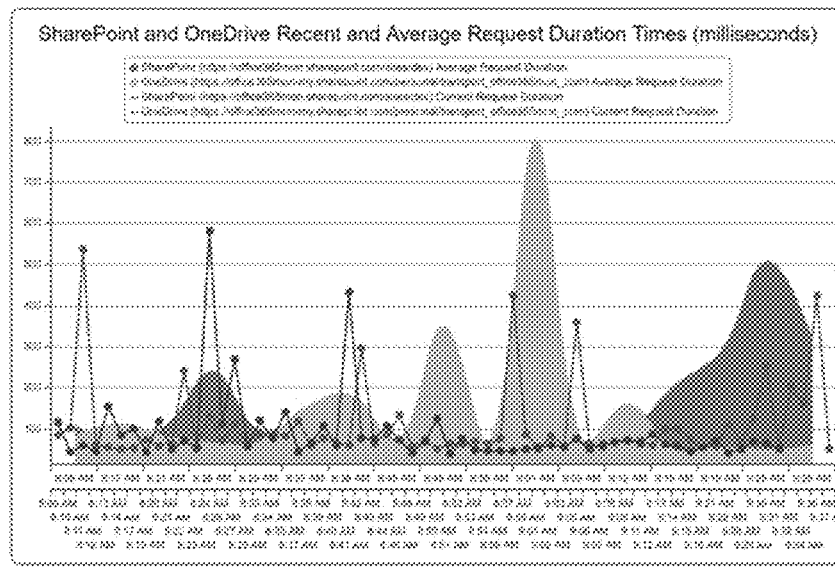
FIGS. 7A-7F are charts of real-time performance or availability data obtained by the monitoring system of FIG. 3.
Figure 7B:
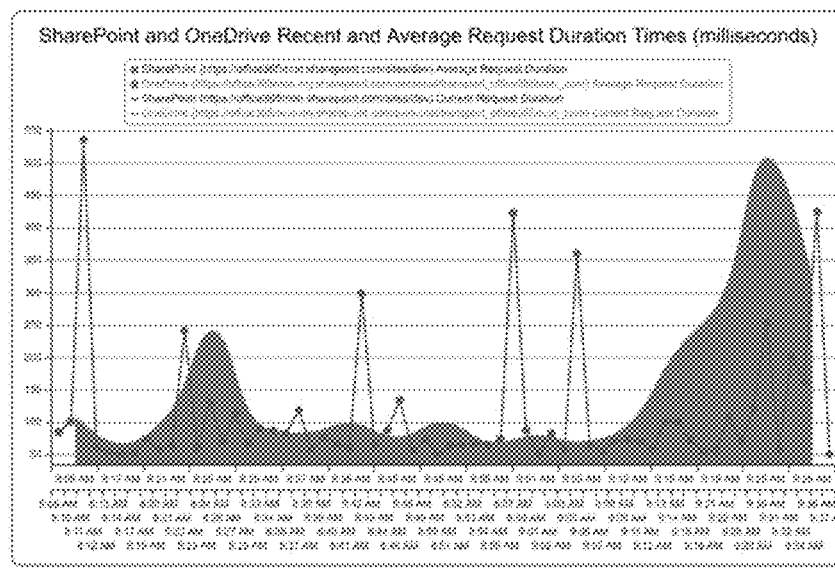
Figure 7C:
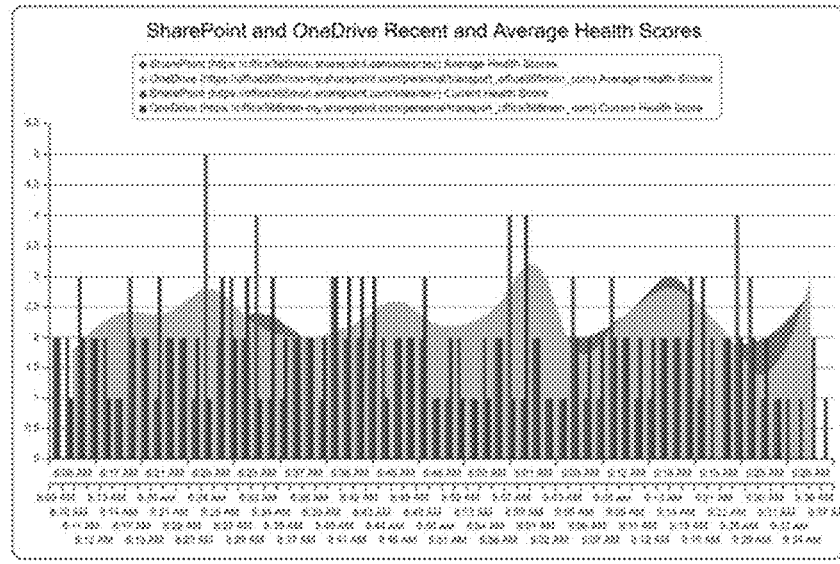

FIGS. 7A-7F are charts of real-time performance data obtained by the monitoring system 300. FIGS. 7A-7B are charts of recent and average request duration times. FIG. 7C is a chart of recent and average health scores. In an embodiment, the health score is something for SharePoint Online and OneDrive for Business that is between 0 and 10 and represents the overall health of a tenant. When your score is 0 things are as healthy as possible; the more the score increases, the less healthy the tenant is. Request duration is the amount of time that it takes to process synthetic transactions that we send to your tenant while we monitor it. As request durations increase, users begin to see it as "Office 365 is slow today" or "our network is slow."

Figure 7D:
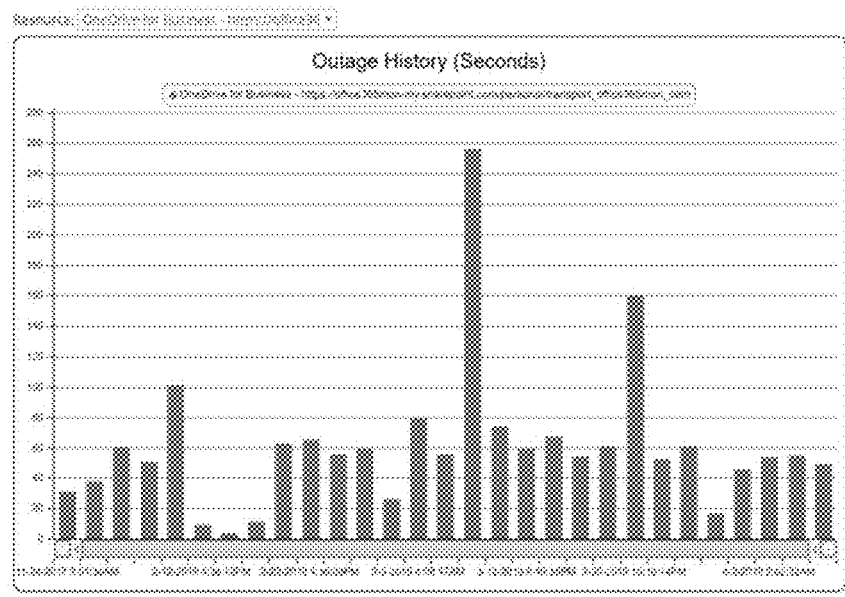
Figure 7E:
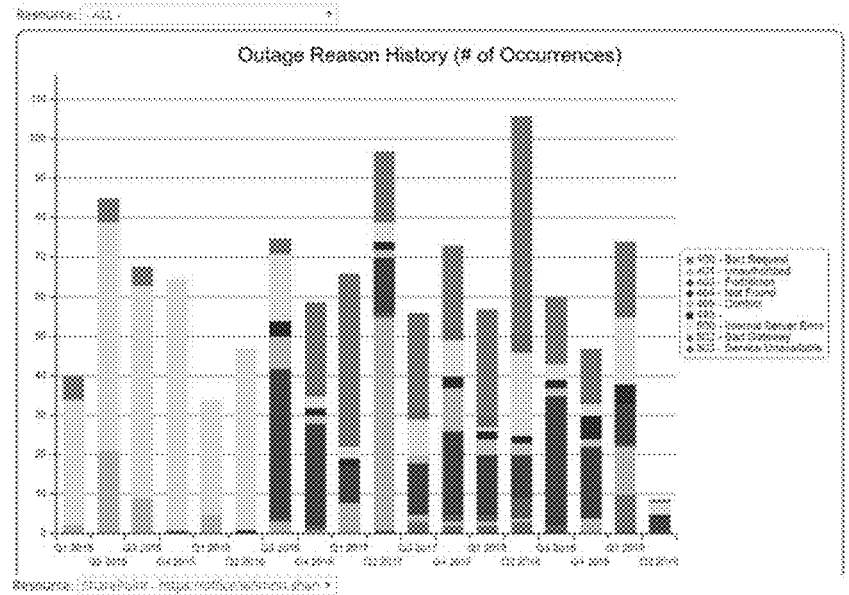
Figure 7F:
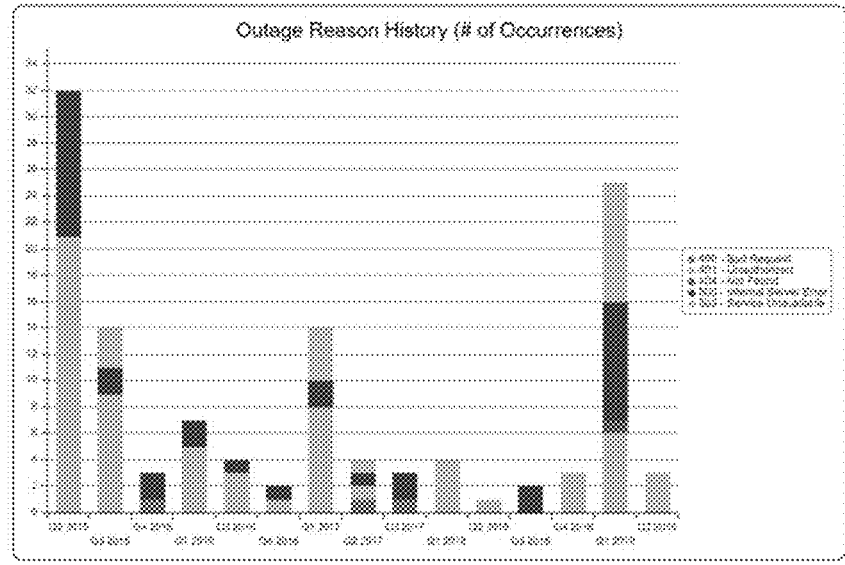

FIG. 7C is a chart of server health. FIGS. 7D-7E are charts of outage reason history. The monitoring system 300 can detect outages as well as reasons for the outages using the probes 306, 308.

Process

Figure 8:
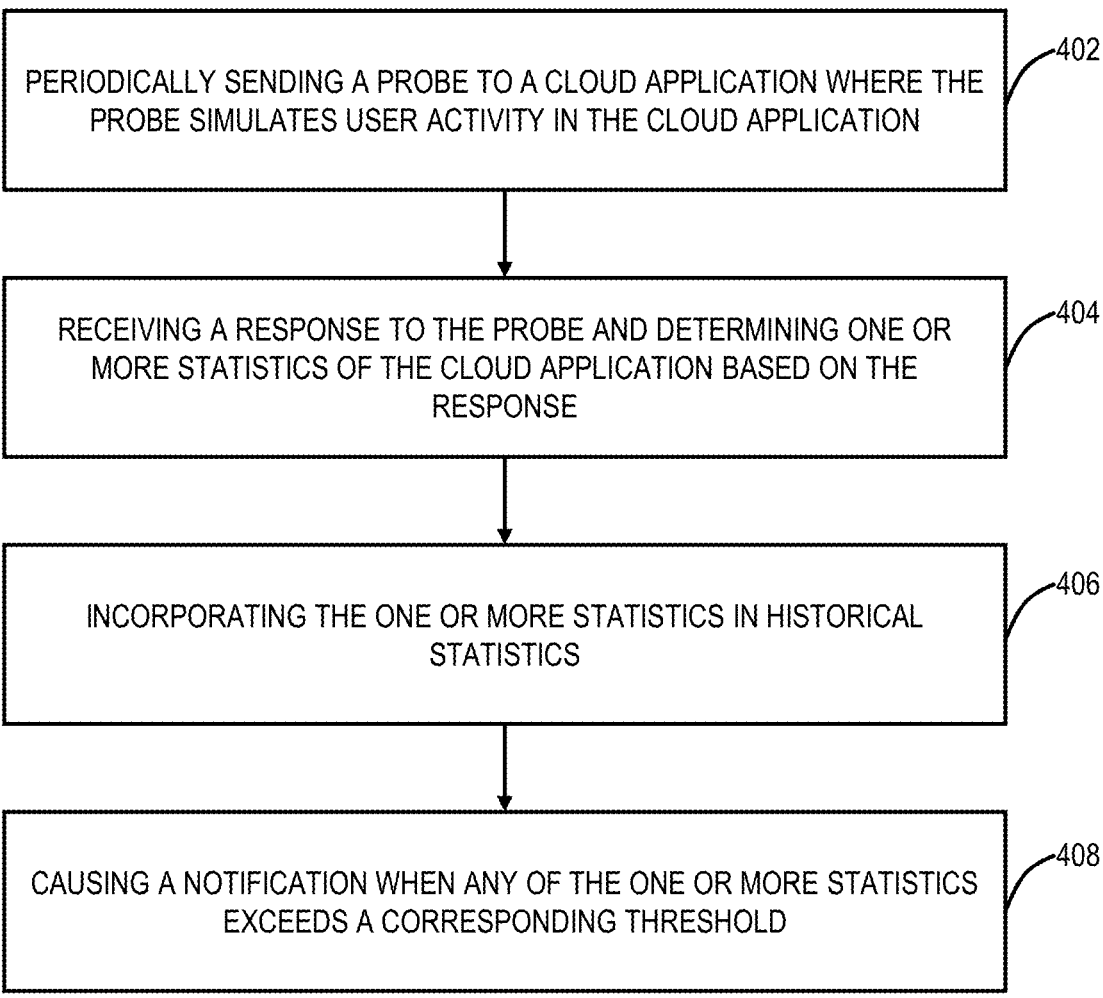
FIG. 8 is a flowchart of a cloud application monitoring process.

FIG. 8 is a flowchart of a cloud application monitoring process 400. The process 400 includes periodically sending a probe to a cloud application where the probe simulates user activity in the cloud application (step 402); receiving a response to the probe and determining one or more statistics of the cloud application based on the response (step 404); incorporating the one or more statistics in historical statistics (step 406); and causing a notification when any of the one or more statistics exceeds a corresponding threshold (step 408).

The probe can be a cloud-based probe from the cloud-based system 100, and the cloud application monitoring process can also include receiving a response to an on-premises probe that was sent by a distributed agent that is separate from the cloud-based system; and incorporating one or more statistics associated with the response to the on-premises probe in the historical statistics. The distributed agent can be on user equipment located at geographic locations where users of the cloud application are located. The cloud application can be Microsoft Office 365. The cloud application can be an audio and/or video conferencing application, and the probe can be utilized to determine jitter, latency, and packet loss. The cloud application can be a collaboration application.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A system comprising:
a plurality of nodes communicatively coupled to one another forming a cloud-based system configured to implement cloud-based services, each node of the cloud-based system including one or more processors and memory comprising instructions that, when executed, cause the one or more processors to
periodically send a probe from the respective node a cloud application of the cloud-based services where the probe simulates user activity in the cloud application,
receive a response to the probe and determine one or more statistics of the cloud application based on the response,
incorporate the one or more statistics in historical statistics, and
provide a notification when any of the one or more statistics exceeds a defined threshold.

2. The system of claim 1, further comprising:
a plurality of distributed agents each configured to
periodically send an on-premises probe to the cloud application where the probe simulates user activity in the cloud application,
receive a response to the on-premises probe, and
provide any of the response and one or more statistics associated with the response to the on-premises probe to the cloud-based system.

3. The system of claim 2, wherein the plurality of distributed agents are on user equipment located at geographic locations where users of the cloud application are located.

4. The system of claim 1, wherein the cloud application includes Microsoft Office 365.

5. The system of claim 1, wherein the cloud application includes an audio and/or video conferencing application.

6. The system of claim 5, wherein the probe is utilized to determine jitter, latency, and packet loss.

7. The system of claim 1, wherein the cloud-based system is a multi-tenant cloud including users from multiple organizations, and the system is configured to monitor the cloud application for multiple organizations both individually and globally by consolidating data from probes from the multiple organizations for the cloud application.

8. A non-transitory computer-readable storage medium having computer-readable code stored thereon for programming one or more processors of a node of a cloud-based system to perform steps of:
periodically sending a probe from the node to a cloud application of cloud-based services implemented by the cloud-based system where the probe simulates user activity in the cloud application;
receiving a response to the probe and determining one or more statistics of the cloud application based on the response;
incorporating the one or more statistics in historical statistics; and
causing a notification when any of the one or more statistics exceeds a defined threshold.

9. The non-transitory computer-readable storage medium of claim 8, wherein the probe is a cloud-based probe from a cloud-based system, and the computer-readable code stored further programs the one or more processors to perform steps of receiving a response to an on-premises probe that was sent by a distributed agent that is separate from the cloud-based system; and incorporating one or more statistics associated with the response to the on-premises probe in the historical statistics.

10. The non-transitory computer-readable storage medium of claim 9, wherein the distributed agent is on user equipment located at geographic locations where users of the cloud application are located.

11. The non-transitory computer-readable storage medium of claim 8, wherein the cloud application includes Microsoft Office 365.

12. The non-transitory computer-readable storage medium of claim 8, wherein the cloud application includes an audio and/or video conferencing application.

13. The non-transitory computer-readable storage medium of claim 12, wherein the probe is utilized to determine jitter, latency, and packet loss.

14. The non-transitory computer-readable storage medium of claim 8, wherein the cloud-based system is a multi-tenant cloud including users from multiple organizations, and the system is configured to monitor the cloud application for multiple organizations both individually and globally by consolidating data from probes form the multiple organizations for the cloud application.

15. A method for monitoring a cloud application of cloud-based services implemented by a cloud-based system including a plurality of nodes, the method comprising:

periodically sending a probe from a node of the plurality of nodes to the to cloud application where the probe simulates user activity in the cloud application;

receiving a response to the probe and determining one or more statistics of the cloud application based on the response;

incorporating the one or more statistics in historical statistics; and causing a notification when any of the one or more statistics exceeds a corresponding threshold.

16. The method of claim 15, wherein the probe is a cloud-based probe from a cloud-based system, and the method further comprising receiving a response to an on-premises probe that was sent by a distributed agent that is separate from the cloud-based system; and incorporating one or more statistics associated with the response to the on-premises probe in the historical statistics.

17. The method of claim 16, wherein the distributed agent is on user equipment located at geographic locations where users of the cloud application are located.

18. The method of claim 15, wherein the cloud application includes Microsoft Office 365.

19. The method of claim 15, wherein the cloud application includes an audio and/or video conferencing application.

20. The method of claim 19, wherein the probe is utilized to determine jitter, latency, and packet loss.

\* \* \* \* \*